UNITED STATES PATENT OFFICE.

ARTHUR LYELL BROOKE AND ROBERT DUNBAR MACKINTOSH, OF MORTLAKE, ENGLAND.

ALLOY.

1,070,007.　　　　Specification of Letters Patent.　　Patented Aug. 12, 1913.

No Drawing.　　Application filed June 25, 1910.　Serial No. 568,840.

*To all whom it may concern:*

Be it known that we, ARTHUR LYELL BROOKE and ROBERT DUNBAR MACKINTOSH, subjects of the King of Great Britain, residing at 103 High street, Mortlake, in the county of Surrey, England, have invented a new and useful Improvement in Alloys, of which the following is a specification.

This invention relates to alloys of aluminium, and has for its object to produce a new alloy containing aluminium, nickel and magnesium which is suitable for manufacturing fancy articles, large or small, where strength, malleability, lightness, durability and polish are required. The alloy is particularly suitable, for the manufacture of surgical and scientific instruments, and roller skates and accessories. It can also be advantageously employed in the manufacture of kitchen utensils, motor car, steam and railway fittings of all kinds, engine parts and propellers, electrical fittings, accessories for flying machines and the like.

The alloy is produced by melting aluminium in a suitable crucible, and then allowing it to cool. When cold an oxid of nickel is added and covered with "light" or "heavy" magnesium oxid mixed with a material which has a reducing tendency, such as powdered wood charcoal. The crucible is then heated to a temperature of 1600° C. whereupon metallic magnesium is added, care being taken that the molten metal is kept well covered with the reducing material in order to prevent ignition and oxidation. It is also important to stir the mixture of aluminium and nickel with a carbon rod before adding the metallic magnesium in order to promote the admixture of the metals. The alloy may also be prepared by heating an oxid or hydrate of nickel in a crucible with a reducing agent so as to produce metallic nickel. The temperature is then raised, the required proportion of pure aluminium is added, and the mass is well stirred. A small quantity of metallic zinc is added to the mixture together with a little zinc chlorid for the purpose of refining the alloy. A suitable quantity of metallic magnesium is then added, and after stirring the alloy is poured into suitable molds.

In order that the nature of the invention may be clearly understood it will now be described in accordance with the following examples:—

Before use the crucible, which should be well annealed is lined with a paste consisting of 70 parts of "heavy" magnesium oxid and 20 parts of pulverized charcoal mixed with a suitable quantity of water. The "heavy" magnesium oxid can be replaced if desired by aluminium hydrate. The object of lining the crucible in this manner is to prevent the oxid and molten metal from coming into contact with the bare walls of the crucible whereby double silicates may be formed.

The "light" magnesium oxid above referred to is the well known product prepared by precipitating a dilute solution of Epsom salts in the cold with sodium carbonate, washing with boiling water and drying at 100° C. The "heavy" magnesium oxid is obtained by adding sodium carbonate solution to a boiling concentrated solution of Epsom salts, evaporating to dryness, digesting with water, filtering and washing and finally drying at 100° C.

Example 1: In a crucible prepared as above described is placed 85 kilos aluminium, and the crucible is heated until the aluminium melts, whereupon it is allowed to cool. 15 kilos of nickel monoxid (NiO) or nickel hydrate (Ni(OH)$_2$) or nickel sesqui-oxid (Ni$_2$O$_3$) is then added and covered with a layer of a mixture of carbon and "heavy" or "light" magnesium oxid (MgO). The contents of the crucible are then heated to a temperature of 1600° C. and the molten mass thoroughly stirred with a carbon rod, 15 kilos of metallic magnesium in the form of rods are then added and allowed to melt and mix with the other materials in the crucible. Care should be taken during this operation to add sufficient carbon in order to keep the alloy well covered as to prevent ignition and oxidation. When the magnesium has been melted and thoroughly mixed with the other materials, the molten alloy is poured into suitable molds, the dross being carefully removed while pouring.

Example 2: In a crucible prepared as above described is placed 100 kilos of aluminium which is heated to the melting point and then allowed to cool. 16.5 kilos of nickel sesqui-oxid are then added which is covered with a mixture of carbon and "heavy" or "light" magnesium oxid. The crucible is then heated until a temperature of 1600° C. has been attained and the molten mass is well stirred with a carbon rod in order to promote the admixture of the different materials. 7.5 kilos of metallic magnesium is then added in the form of rods, which is allowed to melt and stirred with the other materials in the crucible, care being taken to add sufficient carbon in order to keep the alloy well covered so as to prevent ignition and oxidation. The molten alloy can then be poured into molds, the dross being carefully removed.

Example 3: 10 to 15 kilos of nickel oxid are heated in a plumbago crucible coated as above described with a layer of carbon and magnesia to a temperature of 1600° C. so as to reduce the nickel, 85 kilos of aluminium are then added, and when melted the crucible is allowed to cool to a bright red heat say 900° C. when 1 to 5 kilos of magnesium is added. This melts at once and when the metals have been thoroughly mixed together the alloy may be poured into the molds.

The new alloy can also be prepared in the manner described in the above examples, the component materials being used in the following proportions:—

|  | A | B |
|---|---|---|
| Aluminium | 90 kilos | 75 kilos |
| Nickel monoxid | 10 kilos | 20 kilos |
| Magnesium | 1 to 5 kilos | 1 to 5 kilos |

|  | C | D | E |
|---|---|---|---|
| Aluminium | 90 kilos | 90 kilos | 100 kilos |
| Nickel sesqui-oxid | 5 kilos | 10 kilos | 5 kilos |
| Magnesium | 5 kilos | 1½ to 5 kilos | 1½ to 5 kilos |

Example 4: In a crucible coated as above described is placed 10 to 50 kilos of chemically pure nickel oxid (green). This oxid is reduced to the metallic state under a layer of charcoal at a white heat, say 1300° C. The temperature is then raised to a dazzling white heat which corresponds to about 1500° or 1600° C. and metallic aluminium is added in proportion sufficient to bring the total weight of metal to 100 kilos. The alumininm which should be of 99.7% purity is previously heated in order to avoid cooling the metal in the crucible. When all the aluminium has been melted the mixture is well stirred with suitable rods whereupon the crucible is taken from the furnace and the carbon removed from the top of the molten metal. About $\frac{1}{10}$th kilo of zinc for each hundred kilos of the mixture is then added together with 25 to 30 grams of chlorid of zinc, the mixture being well stirred so that the dross is brought to the top of the molten metal whence it can be readily removed. The temperature is raised again to a cherry red heat, about 1000° C. whereupon the crucible is taken from the furnace and 1% of pure magnesium shavings are added. This is allowed to ignite until it is completely oxidized, a small quantity being absorbed by the alloy, and after the molten metal has been skimmed it is ready for casting in suitably prepared sand molds. The use of magnesium in this way has the effect of removing impurities from the alloy, although a small quantity of the magnesium is retained in the alloy.

Example 5: The process described in the previous example is carried out as above described, and the same proportions of materials are used, unless nickel sesqui-oxid is employed instead of the monoxid when the proportions are increased in accordance with the molecular weight, for instance 165 parts of nickel sesqui-oxid will be used in place of 149 parts of nickel monoxid to give the same yield of nickel. When the zinc and zinc chlorid have been added the molten metal is cast into ingots and allowed to cool. 50 to 99 parts of the alloy is then re-melted, and 50 to 7 parts of pure magnesium preferably in the form of rods is added. The metallic magnesium is allowed to melt under a layer of charcoal or fluorspar and sodium chlorid and is then well stirred and skimmed and cast in suitably prepared sand molds. For stirring it is desirable to use a carbon rod which not only permits the admixture of the various ingredients, but owing to the formation of carbonic oxid protects the metals from oxidation. The magnesium added to the alloy has the effect of removing any impurities which may have been contained in the nickel oxid used and it also reduces any occluded carbonic oxid in the mass forming magnesia and causing the carbon to separate out as graphite.

Example 6: In a crucible prepared as above described 10 to 50 kilos of nickel oxid is reduced to the metallic state in accordance with the process outlined in Example 1. In another crucible prepared in the same manner sufficient aluminium to bring the total weight of aluminium and nickel to 100 kilos is heated to a dazzling white heat corresponding to 1500 to 1600 degrees C. The aluminium is melted under a layer of carbon and argol (crude cream of tartar). Another crucible prepared as above described is heated to a bright red heat, and the component metals are poured together into this third crucible, being well stirred while pouring and then cast into ingots in suitable molds. 50 to 99 parts of this alloy of nickel and aluminium is then taken and from 50 to 1 parts of magnesium are added to the molten aluminium nickel alloy, that is to say, from 50 to 99 parts of the aluminium nickel alloy are taken and alloyed with a quantity of magnesium equal to the difference between the aforesaid weight and 100. The mixture is allowed to melt under a layer of carbon and argol, and after being vigorously stirred is cast into suitable molds. The best results are obtained when the alloy is cast in chill or sand molds. When using the latter it is desirable to employ a good quality of sand which has not been used for casting other than the present alloys, and in any case the molds should be carefully dusted before use with a mixture of carbon and "light" magnesium oxid in the following propositions:—"light" magnesium oxid, 25 parts; carbon, preferably pulverized wood charcoal, 75 parts.

The alloy prepared in accordance with this invention is light, homogeneous, strong and malleable, takes a high polish and can be wrought both hot and cold, cast and rolled. It resists the action of most dilute acid and alkaline solutions.

It should be understood that all ingredients used should be chemically pure, and the new alloy can also be prepared by varying the proportions of the component materials above indicated.

It is well-known that the character of many alloys is changed on re-casting, and that scraps of an alloy when re-melted, do not usually produce a useful alloy unless a certain quantity of new material is added. For instance an alloy which is highly malleable, ductile and tenacious may when re-melted from scraps of the material result in a brittle and unworkable alloy. If, however, a quantity of the alloy manufactured in accordance with this invention is added to the scraps the combination may form an alloy superior in many respects to the original one.

It should be observed that the crucibles used in preparing this alloy should be reserved especially for the purpose and no crucibles which have been used for preparing other alloys should be employed.

It is desirable to use tilting furnaces for carrying out the operations herein described.

We claim as our invention:—

1. The process of producing an alloy of aluminium, nickel and magnesium which comprises heating an oxygen compound of nickel with a reducing agent so as to produce metallic nickel, raising the temperature to a white heat, adding aluminium thereto, stirring the same, and finally adding magnesium.

2. The process of producing an alloy of aluminium, nickel and magnesium, which comprises reducing 10 to 50 parts of nickel oxid with carbon at a white heat, raising the temperature to a dazzling white heat, adding sufficient aluminium to bring the total weight of metal to 100 parts, removing the carbon from the top of the molten metal, adding $\frac{1}{10}$th part of zinc for each 100 parts of metal, adding a small quantity of chlorid of zinc, raising the temperature to a cherry-red heat, and adding magnesium thereto.

3. The process of producing an alloy of aluminium, nickel and magnesium, which comprises reducing nickel oxid with carbon adding aluminium and a small quantity of zinc and zinc chlorid thereto, then adding magnesium which is permitted to ignite in contact with the alloy.

In testimony whereof we have hereunto subscribed our names this fourteenth day of June 1910.

ARTHUR LYELL BROOKE.
ROBERT DUNBAR MACKINTOSH.

Witnesses:
ARTHUR A. BERGIN,
R. S. ANDERSON.